(12) United States Patent
Chandwani (10) Patent No.: US 9,225,684 B2
(45) Date of Patent: Dec. 29, 2015

(54) CONTROLLING NETWORK ACCESS

(75) Inventor: Santosh Chandwani, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1832 days.

(21) Appl. No.: 11/926,794

(22) Filed: Oct. 29, 2007

(65) Prior Publication Data

US 2009/0113540 A1 Apr. 30, 2009

(51) Int. Cl.
- G06F 7/04 (2006.01)
- G06F 15/16 (2006.01)
- G06F 17/30 (2006.01)
- H04L 29/06 (2006.01)

(52) U.S. Cl.
CPC .... H04L 63/0227 (2013.01); *G06F 2221/2115* (2013.01); *G06F 2221/2149* (2013.01); *H04L 63/10* (2013.01)

(58) Field of Classification Search
CPC ...................................... G06F 21/20
USPC ........... 709/227, 225; 713/189, 200; 717/168; 726/1, 26, 3
See application file for complete search history.

(56) References Cited

U.S. PATENT DOCUMENTS

| | | |
|---|---|---|
| 5,557,518 A | 9/1996 | Rosen |
| 5,659,616 A | 8/1997 | Sudia |
| 5,752,042 A | 5/1998 | Cole et al. |
| 6,023,586 A | 2/2000 | Gaisford et al. |
| 6,035,423 A | 3/2000 | Hodges et al. |
| 6,088,451 A | 7/2000 | He et al. |
| 6,134,680 A | 10/2000 | Yeomans |
| 6,151,643 A | 11/2000 | Cheng et al. |
| 6,154,776 A | 11/2000 | Martin |
| 6,233,577 B1 | 5/2001 | Ramasubramani et al. |
| 6,233,616 B1 | 5/2001 | Reid |
| 6,247,128 B1 | 6/2001 | Fisher et al. |
| 6,275,941 B1 | 8/2001 | Saito et al. |
| 6,301,613 B1 | 10/2001 | Ahlstrom et al. |
| 6,301,710 B1 | 10/2001 | Fujiwara |
| 6,321,339 B1 | 11/2001 | French et al. |
| 6,327,550 B1 | 12/2001 | Vinberg et al. |

(Continued)

FOREIGN PATENT DOCUMENTS

| | | |
|---|---|---|
| JP | 2004-048234 | 12/2004 |
| WO | WO 04/002062 A1 | 12/2003 |

(Continued)

OTHER PUBLICATIONS

Archan Misra, Autoconfiguration, registration, and mobility management for pervasive computing; Year: 2001; IEEE, pp. 1-8.*

(Continued)

*Primary Examiner* — Monjour Rahim
(74) *Attorney, Agent, or Firm* — Danielle Johnston Holmes; Micky Minhas (57) ABSTRACT

Systems and methods for controlling network access determine that a client computer on the network is in compliance with administrator-defined network health policy standards before the client computer is granted access to the network. A packet exchange mechanism is defined wherein filtering instructions from a server are converted into firewall rules on the client computer to restrict client access to remediation servers on the network. The client computer obtains update patches from the remediation servers to become compliant with network health policy standards.

20 Claims, 6 Drawing Sheets

(56) References Cited

U.S. PATENT DOCUMENTS

| | | | |
|---|---|---|---|
| 6,389,539 B1 | 5/2002 | Hamilton, II et al. | |
| 6,393,484 B1* | 5/2002 | Massarani | 709/227 |
| 6,412,077 B1 | 6/2002 | Roden et al. | |
| 6,460,141 B1 | 10/2002 | Olden | |
| 6,553,493 B1 | 4/2003 | Okumura et al. | |
| 6,564,320 B1 | 5/2003 | de Silva et al. | |
| 6,601,175 B1 | 7/2003 | Arnold et al. | |
| 6,611,869 B1 | 8/2003 | Eschelbeck et al. | |
| 6,615,383 B1 | 9/2003 | Talluri et al. | |
| 6,754,664 B1 | 6/2004 | Bush | |
| 6,847,609 B1 | 1/2005 | Sarnikowski et al. | |
| 6,854,056 B1 | 2/2005 | Benantar et al. | |
| 6,871,284 B2 | 3/2005 | Cooper et al. | |
| 6,873,988 B2 | 3/2005 | Herrmann et al. | |
| 6,892,317 B1 | 5/2005 | Sampath et al. | |
| 6,966,059 B1 | 11/2005 | Shetty et al. | |
| 6,993,686 B1 | 1/2006 | Groenendaal et al. | |
| 7,010,807 B1 | 3/2006 | Yanovsky | |
| 7,020,532 B2 | 3/2006 | Johnson et al. | |
| 7,032,022 B1* | 4/2006 | Shanumgam et al. | 709/225 |
| 7,039,807 B2 | 5/2006 | Spitz | |
| 7,043,659 B1 | 5/2006 | Klein et al. | |
| 7,046,647 B2 | 5/2006 | Oba et al. | |
| 7,051,243 B2 | 5/2006 | Helgren et al. | |
| 7,100,085 B2 | 8/2006 | Miller | |
| 7,111,205 B1 | 9/2006 | Jahn et al. | |
| 7,124,326 B1 | 10/2006 | Niikawa | |
| 7,143,435 B1 | 11/2006 | Droms et al. | |
| 7,249,187 B2 | 7/2007 | Sobel et al. | |
| 7,272,625 B1 | 9/2007 | Hannel | |
| 7,287,195 B1 | 10/2007 | Folkesson | |
| 7,299,354 B2 | 11/2007 | Khanna et al. | |
| 7,315,890 B2 | 1/2008 | Tilton et al. | |
| 7,383,579 B1 | 6/2008 | Catanzano | |
| 7,389,444 B2 | 6/2008 | Ma et al. | |
| 7,392,430 B2 | 6/2008 | Greenlee et al. | |
| 7,403,901 B1 | 7/2008 | Carley et al. | |
| 7,409,594 B2 | 8/2008 | Mukherjee et al. | |
| 7,526,677 B2 | 4/2009 | Choe et al. | |
| 7,526,792 B2 | 4/2009 | Ross | |
| 7,533,407 B2 | 5/2009 | Lewis et al. | |
| 7,539,862 B2 | 5/2009 | Edgett et al. | |
| 7,793,096 B2 | 9/2010 | Hurst et al. | |
| 7,801,078 B2* | 9/2010 | Kim et al. | 370/331 |
| 7,814,535 B1* | 10/2010 | Barile et al. | 726/5 |
| 7,827,545 B2 | 11/2010 | Choe et al. | |
| 8,065,712 B1* | 11/2011 | Cheng et al. | 726/1 |
| 2001/0047514 A1 | 11/2001 | Goto et al. | |
| 2002/0010800 A1 | 1/2002 | Riley et al. | |
| 2002/0073308 A1 | 6/2002 | Benantar | |
| 2002/0078347 A1 | 6/2002 | Hericourt et al. | |
| 2002/0093915 A1 | 7/2002 | Larson | |
| 2002/0129264 A1 | 9/2002 | Rowland et al. | |
| 2002/0144108 A1 | 10/2002 | Benantar | |
| 2002/0184619 A1 | 12/2002 | Meyerson | |
| 2002/0199116 A1 | 12/2002 | Hoene et al. | |
| 2003/0009752 A1 | 1/2003 | Gupta | |
| 2003/0014644 A1 | 1/2003 | Burns et al. | |
| 2003/0041167 A1 | 2/2003 | French et al. | |
| 2003/0044020 A1 | 3/2003 | Aboba et al. | |
| 2003/0055962 A1 | 3/2003 | Freund et al. | |
| 2003/0055994 A1 | 3/2003 | Herrmann et al. | |
| 2003/0061318 A1 | 3/2003 | Abdelhadi et al. | |
| 2003/0065919 A1 | 4/2003 | Albert et al. | |
| 2003/0087629 A1 | 5/2003 | Juitt et al. | |
| 2003/0097315 A1 | 5/2003 | Guerrero et al. | |
| 2003/0126136 A1 | 7/2003 | Omoigui | |
| 2003/0126501 A1 | 7/2003 | Musman | |
| 2003/0188156 A1 | 10/2003 | Yasala et al. | |
| 2003/0191966 A1 | 10/2003 | Gleichauf | |
| 2003/0200464 A1 | 10/2003 | Kidron | |
| 2003/0217170 A1 | 11/2003 | Nelson et al. | |
| 2003/0221002 A1 | 11/2003 | Srivastava et al. | |
| 2004/0006532 A1 | 1/2004 | Lawrence et al. | |
| 2004/0039580 A1 | 2/2004 | Steger | |
| 2004/0078569 A1 | 4/2004 | Hotti | |
| 2004/0083129 A1 | 4/2004 | Herz | |
| 2004/0085944 A1 | 5/2004 | Boehm | |
| 2004/0107360 A1 | 6/2004 | Herrmann et al. | |
| 2004/0153171 A1 | 8/2004 | Brandt et al. | |
| 2004/0153791 A1 | 8/2004 | Arend | |
| 2004/0153823 A1 | 8/2004 | Ansari | |
| 2004/0167984 A1 | 8/2004 | Herrmann | |
| 2004/0249974 A1 | 12/2004 | Alkhatib et al. | |
| 2004/0250107 A1 | 12/2004 | Guo | |
| 2004/0268148 A1 | 12/2004 | Karjala et al. | |
| 2005/0015622 A1 | 1/2005 | Williams et al. | |
| 2005/0021733 A1 | 1/2005 | Clinton et al. | |
| 2005/0021975 A1 | 1/2005 | Liu | |
| 2005/0076265 A1 | 4/2005 | Hsu et al. | |
| 2005/0081111 A1 | 4/2005 | Morgan et al. | |
| 2005/0086337 A1 | 4/2005 | Quittek et al. | |
| 2005/0086502 A1* | 4/2005 | Rayes et al. | 713/189 |
| 2005/0114502 A1 | 5/2005 | Raden et al. | |
| 2005/0131997 A1 | 6/2005 | Lewis et al. | |
| 2005/0138204 A1 | 6/2005 | Iyer et al. | |
| 2005/0144532 A1 | 6/2005 | Dombrowa et al. | |
| 2005/0144552 A1 | 6/2005 | Kalthoff et al. | |
| 2005/0165953 A1 | 7/2005 | Oba et al. | |
| 2005/0166197 A1 | 7/2005 | Riley | |
| 2005/0172019 A1 | 8/2005 | Williamson et al. | |
| 2005/0188285 A1 | 8/2005 | Fellenstein et al. | |
| 2005/0193386 A1* | 9/2005 | McCaleb et al. | 717/168 |
| 2005/0198527 A1* | 9/2005 | Johnson et al. | 713/200 |
| 2005/0216957 A1 | 9/2005 | Banzhof et al. | |
| 2005/0229039 A1 | 10/2005 | Anderson et al. | |
| 2005/0254651 A1 | 11/2005 | Porozni et al. | |
| 2005/0256970 A1 | 11/2005 | Harrison et al. | |
| 2005/0267954 A1 | 12/2005 | Lewis et al. | |
| 2006/0002556 A1 | 1/2006 | Paul | |
| 2006/0004772 A1 | 1/2006 | Hagan et al. | |
| 2006/0020858 A1 | 1/2006 | Schaefer | |
| 2006/0033606 A1 | 2/2006 | Howarth et al. | |
| 2006/0036733 A1 | 2/2006 | Fujimoto et al. | |
| 2006/0075140 A1 | 4/2006 | Sobel | |
| 2006/0085850 A1 | 4/2006 | Mayfield et al. | |
| 2006/0089733 A1 | 4/2006 | Dickinson et al. | |
| 2006/0143440 A1 | 6/2006 | Ponnapalli et al. | |
| 2006/0164199 A1 | 7/2006 | Gilde et al. | |
| 2006/0184651 A1 | 8/2006 | Tirnumala | |
| 2006/0250968 A1 | 11/2006 | Hudis et al. | |
| 2006/0256730 A1 | 11/2006 | Compton | |
| 2007/0061623 A1 | 3/2007 | Yuan et al. | |
| 2007/0100850 A1 | 5/2007 | Choe et al. | |
| 2007/0124803 A1 | 5/2007 | Taraz | |
| 2007/0127500 A1 | 6/2007 | Maeng | |
| 2007/0143392 A1 | 6/2007 | Choe et al. | |
| 2007/0150934 A1* | 6/2007 | Fiszman et al. | 726/1 |
| 2007/0198525 A1 | 8/2007 | Chatterjee et al. | |
| 2007/0234040 A1 | 10/2007 | Hurst et al. | |
| 2008/0005285 A1 | 1/2008 | Robinson | |
| 2008/0120686 A1 | 5/2008 | Gao et al. | |
| 2009/0077631 A1 | 3/2009 | Keohane | |

FOREIGN PATENT DOCUMENTS

| | | | |
|---|---|---|---|
| WO | WO 2004/042540 A2 | 5/2004 | |
| WO | WO 2004/046953 A1 | 6/2004 | |
| WO | WO 2005/040995 A2 | 5/2005 | |

OTHER PUBLICATIONS

"AAA: from RADIUS to Diameter," 10 pages (Sep. 18, 2003).
"Cisco Network Admission Control and Microsoft Network Access Protection Interoperability Architecture," *Cisco Systems and Microsoft Corporation*, http://www.cisco.com/en/US/netsol/ns466/networking_solutions_package.html, 8 pages (Published: Sep. 2006).
"Cryptographic Provider Names," http://msdn.microsoft.com/library/en-us/seccrypto/security/cryptographic_provider_name . . . , 1 page (Retrieved Oct. 10, 2006).
"Cryptography," http://msdn.microsoft.com/library/en-us/seccrypto/security/cryptography_portal.asp?frame=true, 2 pages (Retrieved Oct. 12, 2006).

(56) References Cited

OTHER PUBLICATIONS

"IPsec," http://www.microsoft.com/technet/itsolutions/network/ipsec/default.mspx, 4 pages (Retrieved Oct. 10, 2006).
"Lockdown Networks Unveils Switch-Level Network Access Control," *IT Observer*, http://www.ebcvg.com/press.php?id=1643, 4 pages (Sep. 13, 2005).
"Network Access Protection," http://www.microsoft.com/technet/itsolutions/network/nap/default.mspx, 4 pages (Retrieved Oct. 10, 2006).
"The Cable Guy—Jul. 2005: Network Access Protection Platform Overview," 8 pages (Published: Jun. 29, 2005; Updated: May 23, 2006).
"TPM Work Group," *Trusted Computing Group*, https://www.trustedcomputinggroup.org/groups/tpm/, 1 page (Retrieved Oct. 10, 2006).
"Windows Resource Protection," http://msdn.microsoft.com/library/en-us/wfp/setup/windows_file_protection_start_page.asp?fram, 1 page (Retrieved Oct. 12, 2006).
Bechler, M. et al., "A Cluster-Based Security Architecture for Ad Hoc Networks," *IEEE Infocom 2004*, 11 pages (Mar. 7-11, 2004).
Bradner, S., "Key words for use in RFCs to Indicate Requirement Levels,", RFC 2119, http://www.ietf.org/rfc/rfc2119.txt, 3 pages (Mar. 1997).
Chong, F. et al., "Web Service Health Modeling, Instrumentation, and Monitoring: Developing and Using a Web Services Health Model for the Northern Electronics Scenario," http://msdn.microsoft.com/library/en-us/dnbda/html/MSArcSeriesMCS6.asp?frame=true, 36 pages (Sep. 2005).
Cisco Systems, "Cisco Clean Access Manager Installation and Administration Guide," Release 3.5, pp. 1-62 (Jan. 2006).
Cisco Systems, "Cisco Clean Access: In-Band and Out-Of-Band Deployment Options and Considerations," White Paper, pp. 1-8 (2003).
Cisco Systems, "Cisco Clean Access: A Network Admissions Control Appliance," http://www.cisco.com/en/US/products/ps6128/products_data_sheet0900aecd802da1b5.html, 6 pages (Retrieved Sep. 26, 2005).
Cisco Systems, "Securing Complexity with NAC Appliance (Cisco Clean Access): A Technical View," *NAC Appliance Technical Marketing Team*, pp. 1-41 (Jun. 2006).
Conry-Murray, A., "Cisco NAC vs. Microsoft NAP," http://www.itarchitectmag.com/shared/article/show/Article.jhtml;jsessionid=NFZ3V0ACPV5KQSNDLPCKHSCJUN, 4 pages (Mar. 1, 2005).
EP Communication dated May 9, 2006 from EP Application No. 05 103 440.3-2413, 6 pages.
European Search Report mailed Aug. 18, 2005 from EP Application No. 05103440.3.2416 PCT/, 4 pages.
F5 Networks, "Best-In-Class Enterprise SSL VPN," 6 pages (Copyright 2005).
Fidelia Releases Windows Version of its NetVigil™ Real-time Performance Management and Monitoring Suite, http://www.fidelia.com/news/2002/news-win-version.php, 2 pages (Retrieved Nov. 7, 2006).
Hoffman, P., "UTF-16, an encoding of ISO 10646," RFC 2781, http://www.ietf.org/rfc/rfc2781.txt, 14 pages (Feb. 2000).
Jaganathan, K., et al..,"SPNEGO-based Kerberos and NTLM HTTP Authentication in Microsoft Windows," RFC 4559, http://www.ietf.org/rfc/rfc4559.txt, 8 pages (Jun. 2006).
Jansen, W. et al., "Policy Expression and Enforcement for Handheld Devices," 23 pages (Apr. 2003).
Johnston, W. et al., "Authorization and Attribute Certificates for Widely Distributed Access Control," *IEEE 7th International Workshops on Enabling Technologies: Infrastructure for Collaborative Enterprises—WETICE '98*, pp. 1-6 (Jun. 17-19, 1998).
Jonsson, J. et al., "Public-Key Cryptography Standards (PKCS) #1: RSA Cryptography Specifications Version 2.1", RFC 3447, 64 pages (Feb. 2003).
Liu, X. et al., "Cisco Systems' Simple Certificate Enrollment Protocol (SCEP)," http://ietfreport.isoc.org/all-ids/draft-nourse-scep-01.txt, 37 pages (Jan. 2000).
Microsoft Corporation, "Microsoft Windows Server 2003 Network Access Quarantine Control," 35 pages (Published: Mar. 2003; Updated: Oct. 2003).
Microsoft Corporation, Microsoft Windows Server System, Internet Protocol Security Quarantine in the Network Access Protection Platform, http://www.microsoft.com/technet/itsolutions/network/nap/napipsec.mspx, 31 pages (Published: Jul. 27, 2005; Updated: Oct. 14, 2005).
Microsoft Corporation, Microsoft Windows Server System, Introduction to Network Access Protection, http://www.microsoft.com/technet/itsolutions/network/nap/napoverview.mspx, 18 pages (Published: Jul. 13, 2004; Updated: Jul. 27, 2005).
Microsoft Corporation, Microsoft Windows Server System, Network Access Protection Platform Architecture, http://www.microsoft.com/technet/itsolutions/network/nap/naparch.mspx, 36 pages (Published: Jul. 13, 2004; Updated: Oct. 14, 2005).
Microsoft Releases Windows Server 2003 Service Pack 1, http://www.microsoft.com/presspass/press/2005/mar05/03-30winservsp1pr.mspx, 4 pages (Retrieved Sep. 26, 2005).
Mockapetris, P., "Domain names—Implementation and Specification," RFC1035, http://www.ietf.org/rfc/rfc1035.txt, 56 pages (Nov. 1987).
Murphy, T., "The cdma2000 packet core network," *Ericsson Review*, No. 2, pp. 88-95 (2001).
New Trusted Computing Group Formed to Advance the Adoption of Open Standards for Trusted Computing Technologies, https://www.trustedcomputinggroup.org/news/press/tcg/2003/2003_04_08_tcg_formed.pdf, 2 pages (Apr. 8, 2003).
Office Action mailed May 10, 2007 in U.S. Appl. No. 10/823,686.
Office Action mailed Dec. 12, 2007 in U.S. Appl. No. 10/973,970.
Office Action mailed Dec. 12, 2007 in U.S. Appl. No. 11/056,276.
Pearce, C. et al., "A Protocol for Secrecy and Authentication within Proxy-Based SPKI/SDSI Mobile Networks," *AusCERT 2004 IT Security Conference*, pp. 1-14 (2004).
Persiano, P. et al., "A Secure and Private System for Subscription-Based Remote Services," *ACM Transactions on Information and System Security*, vol. 6, No. 4, pp. 472-500 (Nov. 2003).
Rigney, C. et al., "Remote Authentication Dial in User Service (RADIUS)," RFC 2058, pp. 1-57 (Jan. 1997).
Rutishauser, U. et al., "Open reference implementation of a SCEP v2 client," pp. 1-35 (Mar. 1, 2002).
Scheifler, R., "X Window System Protocol, Version 11," RFC 1013, pp. 1-101 (Jun. 1987).
TCG Trusted Network Connect TNC Architecture for Interoperability Specification Version 1.0, Revision 4, 39 pages (May 3, 2005).
TCG Trusted Network Connect Tnc Architecture for Interoperability Specification Version 1.1, Revision 2, https://www.trustedcomputinggroup.org/specs/TNC/TNC_Architecture_v1_1_r2.pdf, 40 pages. (May 1, 2006).
TCG Trusted Network Connect TNC Architecture for Interoperability Specification Version 1.2, Revision 4, https://www.trustedcomputinggroup.org/specs/TNC/TNC_Architecture_v1_2_r4.pdf, 41 pages (May 21, 2007).
Tcg Trusted Network Connect TNC IF-TNCCS Specification Version 1.0, Revision 2, https://www.trustedcomputinggroup.org/specs/TNC/TNC_IF-TNCCS_v1_0_r2.pdf, 21 pages (May 1, 2006).
Thompson, J. et al., "A Secure Public Network Access Mechanism," *UNIX Security Symposium III Proceedings*, 13 pages (Sep. 14-16, 1992).
Thompson, M. et al. "Certificate-Based Authorization Policy in a PKI Environment," *ACM Transactions on Information and System Security*, vol. 6, No. 4, pp. 566-588 (Nov. 2003).
Thurm, S., "Cisco Acts to Take Greater Role in Virus Protection of Networks," *The Wall Street Journal*, 2 pages (Nov. 19, 2003).
Wikipedia, "X Window System," http://en.wikipedia.org/wiki/X_Window_System, pp. 1-15 (Retrieved Mar. 4, 2007).
Zorn, G., "Microsoft Vendor-specific RADIUS Attributes," RFC 2548, pp. 1-37 (Mar. 1999).
International Search Report and Written Opinion mailed Mar. 3, 2009, 12 pages.

(56) References Cited

OTHER PUBLICATIONS

"What is Microsoft's Network Access Protection?" Network Access Control Interoperability Lab, 5 in a series, May 2006, pp. 1-2.
Network Access Protection; Microsoft Corporation, Jun. 25, 2007, 7 pages.
David White, Jazib Frahim, Omar Santos, NAC Solution and Technology Overview, Cisco Network Admission Control, vol. II: NAC Deployment and Troubleshooting, Jan. 19, 2007, 6 pages.
Sygate Secure Enterprise, © 2004, Sygate Technologies, Inc., 4 pages.
R. Droms, Ed., Dynamic Host Configuration Protocol for IPv6 (DHCPv6), RFC 3315, 2003, 100 pages.
Rigney et al., "Remote Authentication Dial in User Service (Radius)" [online], RFC 2865, Jun. 2000, Retrieved from: http://www.faqs.org/ftp/rfc/pdf/rfc2865.txt.pdf (67 pgs).
Office Action mailed Jan. 8, 2008 in U.S. Appl. No. 10/823,686 (18 pgs).
Office Action mailed May 16, 2008 in U.S. Appl. No. 10/823,686 (16 pgs).
Notice of Allowance mailed Dec. 16, 2008 in U.S. Appl. No. 10/823,686 (8 pgs).
Office Action mailed Mar. 10, 2009 in U.S. Appl. No. 11/353,872 (28 pgs).
Office Action mailed Aug. 17, 2009 in U.S. Appl. No. 11/353,872 (8 pgs).
Office Action mailed Mar. 1, 2010 in U.S. Appl. No. 11/353,872 (7 pgs).
Office Action mailed Jul. 12, 2010 in U.S. Appl. No. 11/353,872 (7 pgs).
Office Action mailed Nov. 17, 2010 in U.S. Appl. No. 11/353,872 (9 pgs).
Office Action mailed Jul. 9, 2008 in U.S. Appl. No. 10/973,970 (11 pgs).
Office Action mailed Jan. 23, 2009 in U.S. Appl. No. 10/973,970 (13 pgs).
Office Action mailed Jun. 8, 2009 in U.S. Appl. No. 10/973,970 (12 pgs).
Office Action mailed Dec. 22, 2009 in U.S. Appl. No. 10/973,970 (14 pgs).
Office Action dated May 9, 2006 issued in European Application No. 05103440 (6 pgs).
Nomura, "User Authentication system for wireless LAN using Remote Appliance Control Protocol (RACP)," IPSJ SIG Notes, vol. 2001, No. 80, pp. 45-50, Information Processing Society of Japan, Japan, Jul. 27, 2001 (8 pgs).
Office Action dated Apr. 13, 2010 issued in Japanese Application No. 2005-129810 (7 pgs).
Office Action dated Jul. 25, 2008 issued in Chinese Application No. 200510089633.5 (22 pgs).
Office Action mailed Jan. 29, 2009 in U.S. Appl. No. 11/304,420 (37 pgs).
Office Action mailed Jul. 21, 2009 in U.S. Appl. No. 11/304,420 (25 pgs).
Office Action mailed Dec. 22, 2009 in U.S. Appl. No. 11/304,420 (24 pgs).
Notice of Allowance mailed Jun. 28, 2010 in U.S. Appl. No. 11/304,420 (6 pgs).
Office Action mailed Sep. 24, 2008 in U.S. Appl. No. 11/264,198 (8 pgs).
Notice of Allowance mailed Jan. 28, 2009 in U.S. Appl. No. 11/246,198 (4 pgs).
European Search Report dated Mar. 6, 2007 issued in European Application No. 05109345.8 (6 pgs).
Office Action dated Oct. 30, 2007 issued in European Application No. 05109345.8 (1 pg).
Office Action dated Jun. 26, 2009 issued in Chinese Application No. 200510116338.4 (15 pgs).
Office Action dated Jul. 22, 2009 issued in Australian Application No. 2005218909 (3 pgs).
Office Action mailed Dec. 12, 2007 in U.S. Appl. No. 11/056,276 (13 pgs).
Office Action mailed Jul. 2, 2008 in U.S. Appl. No. 11/056,276 (20 pgs).
Office Action mailed Dec. 8, 2008 in U.S. Appl. No. 11/056,276 (18 pgs).
Office Action mailed Apr. 21, 2009 in U.S. Appl. No. 11/056,276 (20 pgs).
Office Action mailed May 12, 2009 in U.S. Appl. No. 11/395,559 (16 pgs).
Office Action mailed Dec. 2, 2009 in U.S. Appl. No. 11/395,559 (8 pgs).
Notice of Allowance mailed Jun. 3, 2010 in U.S. Appl. No. 11/395,559 (8 pgs).
Gao et al., "Availability Models for Protection Techniques of Transport Network Based on ASON Technology", Wireless Communications, Networking and Mobile Computing, 2008. WiCOM '08. Publication Year: 2008 (4 pgs).
Lioudakis et al., "An access control approach for privacy-preserving passive network monitoring", Internet Technology and Secured Transactions, 2009. ICITST 2009. International Conference for; Publication Year: 2009 (8 pgs).
Jourabbaf et al., "ID-NAC: Identity-based network access control for MANETs", Networks, 2008. ICON 2008. 16th IEEE International Conference on Publication Year: 2008 (6 pgs).
David Chadwick, The Use of X.509 and E-Healthcare, year 2003 (11 pgs).
Hochman, InfoSect News, ISN Spec in Works to Secure Wireless Networks, May 10, 2004 (3 pgs).
TCG, Infrastructure for Trusted Computing, Briefing to ACSAC, Dec. 7, 2004 (6 pgs).
Network Access Control Interoperability Lab, What is TCG TNC? May 2007 (2 pgs).
Doman, "'Trusted Network Connect' Puts Hardware Security Agent in Every PC: The technology provides hardware-based tools to allow network managers to ensure that PCs comply with security policies", Information Week, Feb. 14, 2006 (3 pgs).
Network Access Control Interoperability Lab, What is the IETF's NAC Strategy? May 2007 (2 pgs).
Network Access Control Interoperability Lab, What is Microsoft Network Access Protection? May 2006 (2 pgs).
InteropLabs Network Access Control Architecture Alphabet Soup, printed out year 2009.

\* cited by examiner

CONTROLLING NETWORK ACCESS

BACKGROUND

In computer networks, it is advantageous to ascertain the health of a client computer before allowing the client to access the network. By determining that the client computer is compliant with network health policy standards, for example by having the latest antivirus software or a properly installed firewall, the risk to the network can be minimized. If it is determined that a client computer does not comply with administrator-defined network health policy standards, it can be desirable to restrict access to the network until such time as the client becomes compliant with the standards.

When a client connects to a network, different enforcement methods can be used to ensure compliance with network health policy standards. These enforcement methods can include the use of 802.1X authenticating devices, Internet Protocol security policies (IPsec) and the Dynamic Host Configuration Protocol (DHCP). For IPv4 networks, DHCP can be used to control client computer access to a network through the routes and default gateway allocated by the DHCP server to the client. The routes and gateway can be modified by the DHCP server to restrict a non-compliant client's access to the network.

SUMMARY

A method has been developed for a client to demonstrate compliance with the network health policy standards when requesting access to a network. In this method, the client sends a request for access to the network to a server and includes in the request a statement of health (SoH) of the client. The server determines if the client is in compliance with administrator-defined health policy standards on the network. If the client is not in compliance, the server sends a response to the client that includes instructions for remedying the deficiencies in its health and that includes filtering instructions containing the IPv4 or IPv6 addresses of the servers from which it can download the necessary updates or patches. The client converts the filtering instructions into firewall rules that are used by a host-firewall on the client to filter client communications on the network. Based on the firewall rules, the client's access can be restricted to only a specific portion of the network. For instance, the client may be limited to only access remediation servers that can provide required update patches to enable the client to attain compliance with the health policy standards. Alternatively, the client may be limited to specific IP addresses to which the client may communicate, for example to seek the administrator's assistance.

Once the client attains compliance, the client sends another request for access to the server, including an updated statement of health. The server verifies that the client is compliant, and if so, sends a response to the client granting the client full access to the network. The client then changes the firewall rules to permit the client to access the entire network.

In one example embodiment, the method is directed to an IPv6 network using the Dynamic Host Control Protocol, version 6 (DHCPv6). This method defines a sequence of packet exchanges using DHCPv6 in which the client obtains access to the network by sending its statement of health to the server. The server validates the client's statement of health for compliance with the network health policy standards and sends the result of the evaluation to the client, including the remediation and filtering instructions, if necessary. This example embodiment makes use of the vendor-specific information option field in the DHCPv6 protocol for exchange of all the above information between the client and the server. Thus, the client inserts its statement of health in a vendor-specific option field when requesting access to the network. In the response messages to the client, the server also uses the vendor-specific information option field to send the result of the evaluation of the client's statement of health against the network health policy standards. If the server finds that the client is not compliant with these policy standards, it may insert in the vendor-specific information option field any necessary remediation instructions to enable the client to become compliant and insert filtering instructions for the client. The client converts the filtering instructions into firewall rules to restrict client access to the remediation servers on the network. The client computer then uses the remediation instructions to obtain update patches from the remediation servers to become compliant with network health policy standards.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

To increase the integrity of a computer network, health policies are defined to set standards of compliance for client computers on the network. Modern operating systems contain a policy enforcement platform which provides a mechanism for ensuring compliance with these network health policies. Using a policy enforcement platform, a network administrator can create customized health policies and ensure compliance with these health policies before allowing a client computer access to the network. Non-compliant clients can be confined to a restricted part of the network until the clients become compliant with the health policies.

A policy enforcement platform, such as Microsoft's Network Access Protection Platform (NAP) provides for different enforcement mechanisms that can be adopted by customers based on their convenience and preference. One such enforcement mechanism is the Dynamic Host Configuration Protocol (DHCP). Example systems and methods are disclosed herein for using DHCP as a health enforcement mechanism for networks in conjunction with a host firewall on the client computer.

Figure 1:
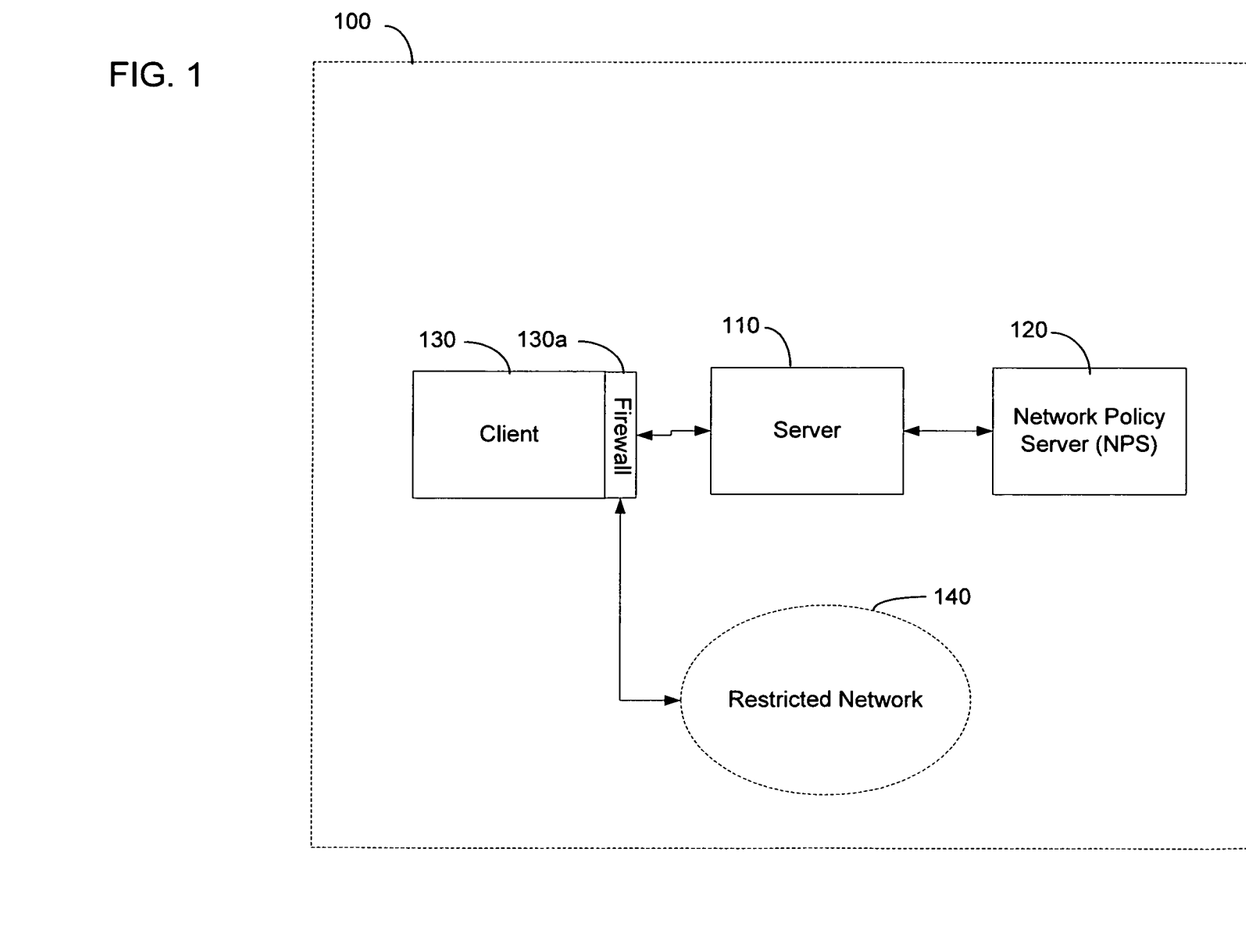
FIG. 1 is an illustration of an example enterprise network.

FIG. 1 shows a diagram of a computer network 100, typical of a corporate enterprise network or Intranet. The network contains a client computer 130 and a server computer 110. The network 100 also contains a network policy server 120 which contains administrator-defined health policies for the network, and a restricted network 140 to which non-compliant clients are directed until such time as the non-compliant clients become compliant.

In example embodiments, the client 130 requests access to the network 100 from the server 110. As part of the request, the client 130 sends a Statement of Health (SoH) to the server that provides information about the client's current health state. In response to the request, the server 110 is programmed to send the client's SoH to the network policy server 120. The network policy server 120 determines whether or not the client 130 is in a health state such that the client 130 can be provided access to the network 100 according to the network policies defined by the network administrator. The network policy server 120 sends a response back to the server 110. The response instructs the server 110 to allow full access for the client 130, to deny access for the client 130, or to allow only partial access to the network 100 for the client 130. It may also include information about specific deficiencies in the client's health state and instructions on how these deficiencies may be remedied.

The server 110, in turn, responds to the client 130. If the client 130 is to be allowed access, the server 110 responds to the client 130 by allowing access. If the client 130 is to be denied access or is to be allowed only partial access to the network 100, the server 110 responds to the client 130 with a set of instructions for a host firewall 130a located on the client. The server also includes information about the deficiencies in the client's health and instructions for remedying these deficiencies. The instructions are used to program the host firewall 130a to allow the client 130 to only access the restricted network 140 until such time as the client 130 is either granted full access (if it has remedied its health) or denied access to the network 100 (on failure to remedy its health within a permitted time period). In example embodiments, the firewall 130 is programmed based on the instructions from the server to limit both outbound and inbound communications to the restricted network 140.

In example embodiments, the restricted network 140 is part of network 100. In one embodiment, the restricted network 140 includes resources that are not critical to the network 100 and can therefore be accessed by clients having less than optimal health. The resources can include one or more remediation servers that allow the client 130 to download patches and/or updated virus signatures to allow the client 130 to improve/remedy the client's state of health. In other examples, the resources can include clients and servers having non-critical data and functionality for the network 100.

Figure 2:
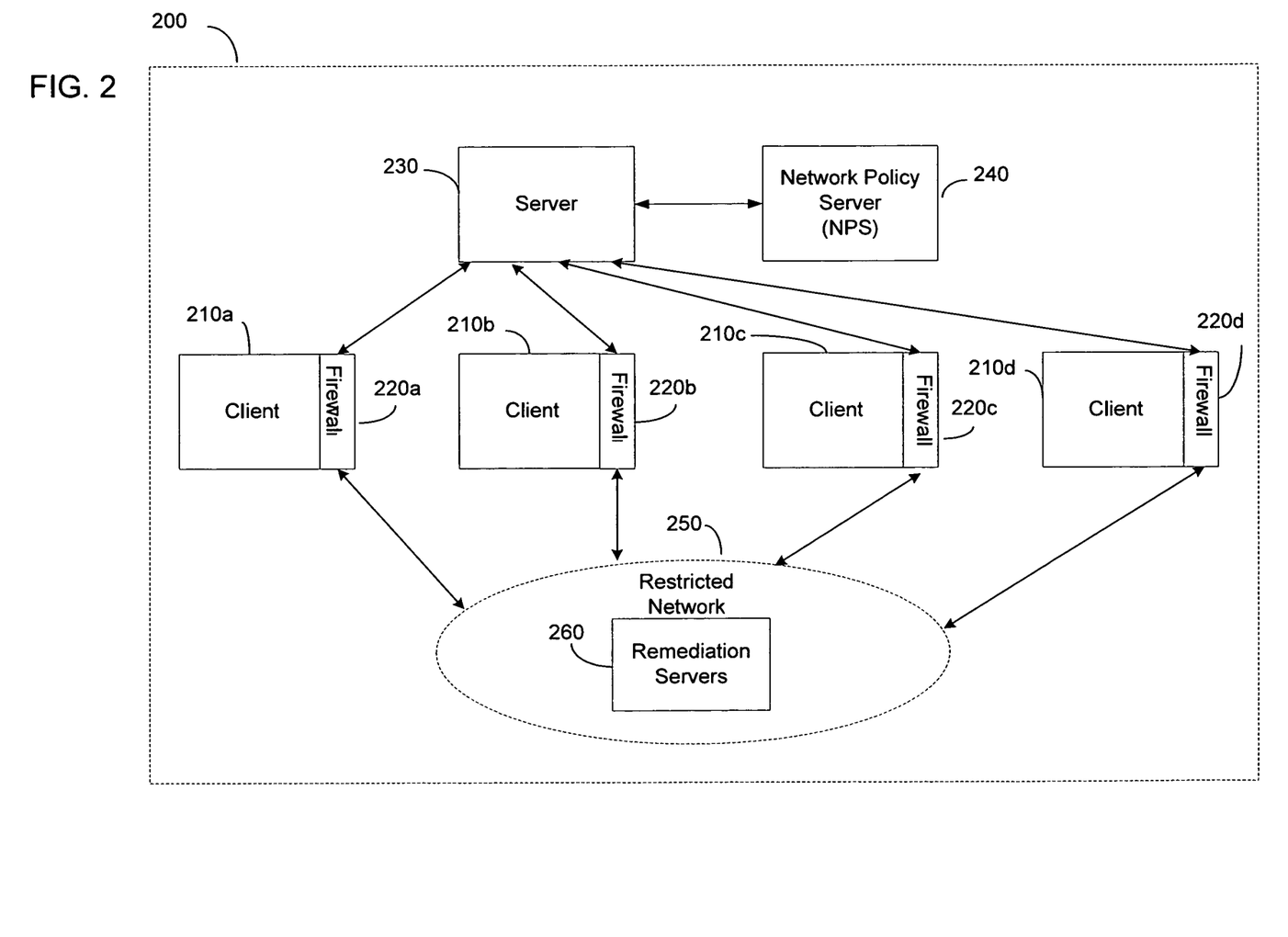
FIG. 2 is another illustration of an example enterprise network.

FIG. 2 shows another example computer network 200. In network 200, one or more client computers 210a, 210b, 210c and 210d are connected to the network 200. Each client 210a, 210b, 210c and 210d contains a firewall (220a, 220b, 220c, 220d), such as the firewall contained in Microsoft Windows Vista or Microsoft Windows XP, Service Pack 2. Alternatively, the client can support firewalls supplied by third parties such as Symantec or McAfee. The clients 210a, 210b, 210c and 210d communicate on the network 200 through their respective firewalls 220a, 220b, 220c, 220d with a server 230, such as Microsoft Windows Server 2008. The computer network also contains a network policy server 240, such as the health policy server that is part of Microsoft's Network Access Protection (NAP) Platform Architecture. The network policy server 240 stores administrator-defined health policies and provides a means for validating the health status of client computers on the network.

In example embodiments, the clients 210a, 210b, 210c and 210d communicate with the server 230 using the Dynamic Host Configuration Protocol Version 6 (DHCPv6) protocol. The DHCPv6 protocol is described in RFC 3315 and defines message types used in a client-server message exchange between Internet Protocol Version 6 (IPv6) nodes. The DHCPv6 protocol also defines a vendor-specific option field in which vendor-specific data can be populated. In the example embodiment, the vendor-specific option field is used to transmit statement of health information from the client to the server and to transmit results of the client's health check, the remediation instructions and the filtering instructions from the server to the client. The filtering instructions are used by the client to create firewall rules that limit client access to the network. The remediation instructions are used by the client to get back in compliance with the network health policy standards.

The network 200 as shown in FIG. 2 also contains a restricted network 250 that includes a remediation server 260. When it is determined that a DHCPv6 client computer is non-compliant with network health policy standards, the client is limited to accessing the restricted network 260. The client can then use the remediation instructions to access the remediation server 260 and download patches to update its state of health. By accessing a remediation server, the client computer can update its antivirus software, its antispyware software, its firewall or other such health attributes as defined by network health policy and thereby become compliant with the health policy standards of the network.

Figure 3:
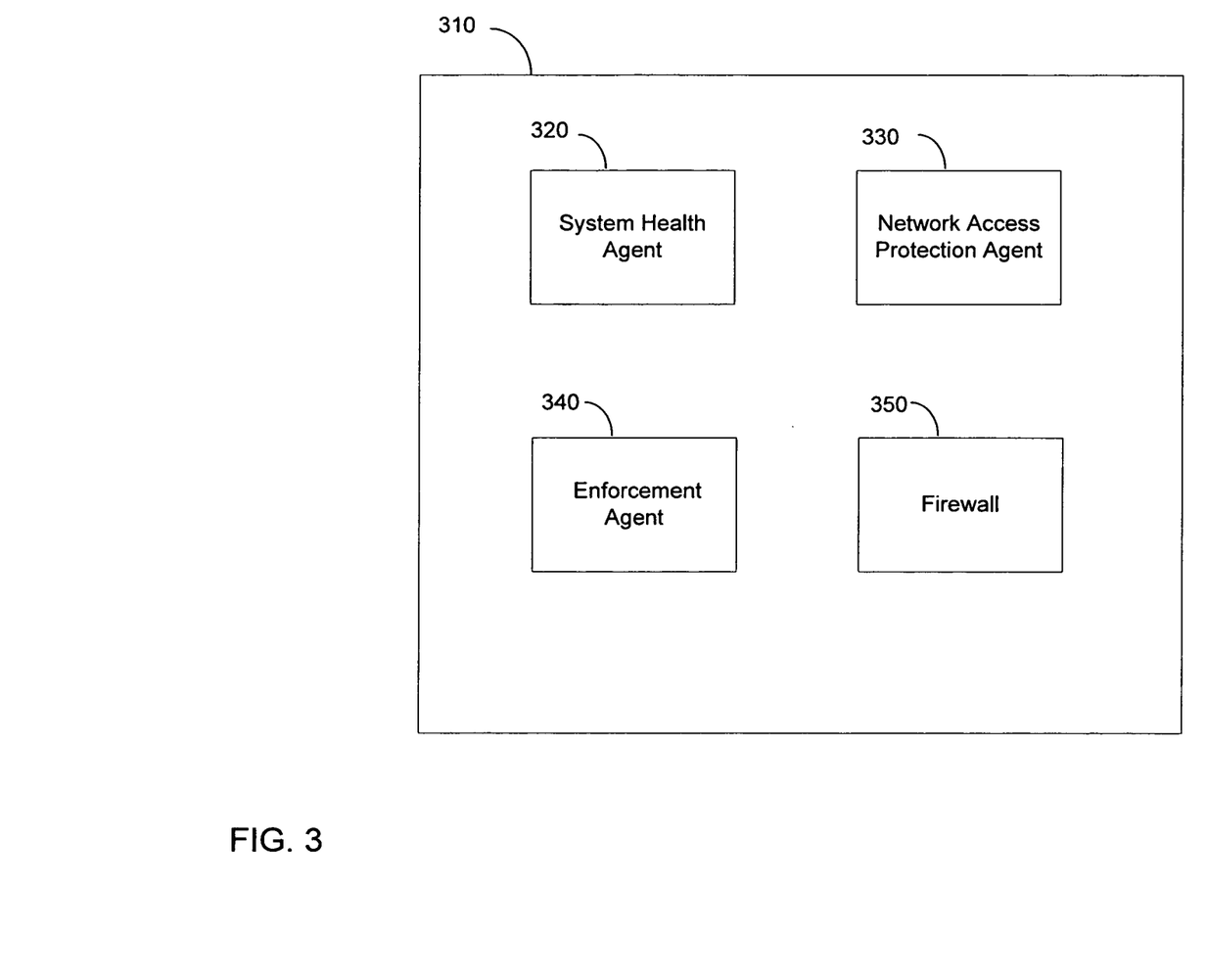
FIG. 3 is an illustration of example functional modules on a client computer.

The DHCPv6 client, such as the client 210a, contains several modules 320, 330, 340, 350 as shown in FIG. 3.

The System Health Agent module 320 monitors and reports on the client's health state. In example embodiments, the System Health Agent module 320 monitors such health attributes as whether antivirus software is installed, enabled and updated, whether antispyware software is installed, enabled and updated, whether Microsoft Update Services is enabled and whether the client has the most recent security updates. Microsoft patent application Ser. Nos. 11/304,420, 11/353,872 and 11/395,559 contain additional descriptions of System Health Agent functionality and are incorporated herein by reference.

The Network Access Protection Agent module 330 collects and stores statement of health information from the System Health Agent module 320. It also processes this information to obtain an indication of the overall state of health of the client. The Network Access Protection agent also provides an interface to the DHCPv6 Enforcement Agent 340, and provides the client's statement of health to DHCPv6 Enforcement Agent module 340 upon request.

The DHCPv6 Enforcement Agent module 340 requests client access to the network. The DHCPv6 Enforcement Agent module 340 obtains the client's statement of health from Network Access Protection module 340 and communicates the client's statement of health to the DHCPv6 server using the DHCPv6 protocol.

The firewall 350 can be controlled via firewall rules to shut down ports in order to restrict network access of the client. A firewall is a hardware or software device which is configured to permit, deny or limit data through a computer network. In a firewall, data is analyzed against a set of filters. As an example, filters can operate on IP addresses, domain names, protocols and ports. For example, some common protocols that can be filtered include IP, TCP, HTTP, FTP, UDP, ICMP, SMTP, SNMP, and Telnet. As another example, a server makes its services available on numbered ports. A web server is typically available on port 80 and an FTP server on port 21. Similarly, client computers can send and receive data on numbered ports and the client can be configured to direct data on ports to specific parts of the network. Firewall rules on a client can be used to enable or disable client ports to permit or restrict access to the network resources.

In example embodiments, the firewall 350 is programmed to initially limit the portions of the network with which the client 210*a* can communicate. For example, the firewall 350 can be programmed to filter outbound and/or inbound messaging such that the client 210*a* can only communicate with resources located in the restricted network 250. When the client becomes compliant with network health policies, the firewall 250 is programmed to reopen the firewall ports to allow full network access to the client 210*a*.

Figure 4:
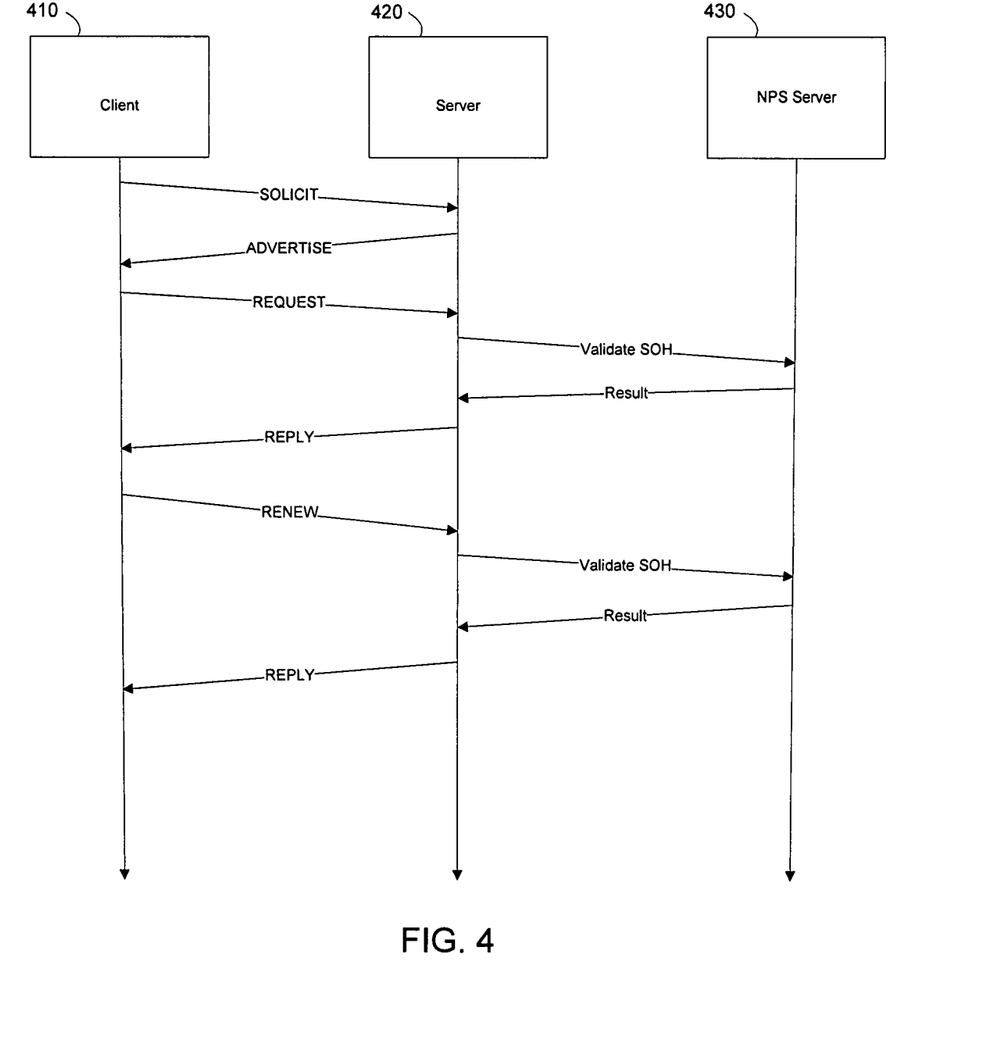
FIG. 4 is an illustration of an example communication scheme between a client, a server, and a network policy server.

FIG. 4 shows an illustration of the example exchange that occurs on the network to ensure client compliance with network health policies. When a DHCPv6 client computer connects to the network, the client sends a multicast DHCPv6 SOLICIT message on the network to determine if there is a DHCPv6 server on the network. The client inserts a vendor-specific option in the SOLICIT message in order to determine if the server supports an enforcement method for network access protection with the value "NAP". The SOLICIT message is received by a DHCPv6 server on the network. The schema for the format of the vendor-specific option to determine whether the server supports NAP enforcement is compliant with the specification in section 22.17 of RFC 3315 and is shown below:

If a DHCPv6 server is present on a network, it indicates its presence to the client by sending a DHCPv6 ADVERTISE message back to the client. In addition, if the server supports an enforcement method for network access protection, such as Microsoft's Network Access Protection platform, the server includes a vendor-specific option in the DHCPv6 ADVERTISE message. The presence of the vendor-specific option in the DHCPv6 ADVERTISE message with the value "NAP" informs the client that the DHCPv6 server supports an enforcement method for network access protection. If the DHCPv6 server does not support an enforcement method for network access protection, it will not include this vendor-specific option in the ADVERTISE message. The DHCPv6 server may ignore SOLICIT messages from clients that do not support enforcement for network access protection based on the server configuration. The schema for the format of the vendor-specific option that the server sends to the client in order to indicate its support for NAP enforcement is compliant with section 22.17 of RFC 3315 and is shown below:

Upon the client receiving the ADVERTISE message indicating that the DHCPv6 server supports an enforcement method for access protection, the DHCPv6 Enforcement Agent (340 in FIG. 4) on the client requests the Network Access Protection Agent (330 in FIG. 3) to retrieve the state of health (SoH) from the various System Health Agent modules on the client (320 in FIG. 3). The client then sends a DHCPv6 REQUEST message to the DHCPv6 server that includes its SoH. In example embodiments, the REQUEST message includes a vendor specific option field. See Internet Specification RFC 3315 (Dynamic Host Configuration Protocol for IPv6), section 22.17, Vendor-specific Information Option. The vendor specific option field is populated with the client's state of health. The schema for the format of the client's state of health in the vendor specific option field is shown below.

Upon receiving the REQUEST message, the DHCPv6 server extracts the client's state of health from the vendor specific option field from the message and sends it to the network policy server. The network policy server validates the client's state of health and determines if it is compliant with administrator-defined network health policies. The network policy server then sends a message to the DHCPv6 server indicating whether the client is compliant. If the client is not compliant, the network policy server may include information about the specific deficiencies in the client's health state and remediation instructions about how the client may remedy these deficiencies by possibly downloading necessary updates or patches from remediation servers. This information from the network policy server constitutes a SOH-Response.

If the client is non-compliant, the DHCPv6 server will create filtering instructions that block all access to the network for the client, except to the essential remediation servers from which the client needs to download the necessary updates that will enable the client to attain compliance. For example, the remediation instructions in the SOH-Response may indicate that the client needs to obtain a specific version of antivirus protection or that it needs to obtain a specific patch to upgrade its operating system. In this case, the server designs the filtering instructions such that the client's access to the network is restricted to only the server's from which the anti-virus signature or the operating system patch can be downloaded. In example embodiments, the filtering instructions provide the IPv4 and/or the IPv6 addresses and possibly port numbers of the remediation servers on the network from which the client may obtain upgrade patches.

The DHCPv6 server then sends the client a DHCPv6 REPLY message, providing a status indication as to whether the client is compliant with network health policies. It does this by including the SoH-Response in a vendor specific option in the REPLY message. In addition, if the client is not compliant, the vendor specific option field will contain the filtering instructions that will enable the client to become compliant. An example schema for the SoH-Response and the filtering instructions are shown below. Example schema for filtering instructions are shown for IPv6 and IPv4 addresses.

-continued

| Option Code = 0x00E1 | Option Length = 4 * number of IPv4 addresses |
|---|---|
| Option Data = <IPv4 Addresses> ||
| ... ||
| ... ||

When the client receives the REPLY message, the client determines from the SoH-Response in the vendor specific option field whether it is compliant with the defined network health policies. If it is not compliant, the client extracts the filtering instructions from the vendor specific option field and translates these filtering instructions into firewall rules. The DHCPv6 enforcement agent on the client will apply the firewall rules to firewall control points to effectively restrict the client access to the network.

Based on the firewall rules, client traffic is limited to one or more remediation servers so that the client can obtain update patches from these remediation servers. The client will request specific updates (for example to specific operating system security patches or to anti-virus signature updates) based on the instructions in the vendor specific option field of the REPLY message. In this manner, the client will obtain the needed upgrades to its state of health and become compliant with the defined health policy standards of the network.

When the client has obtained all the updated state of health information as specified in the instructions in the REPLY message, the client sends a DHCPv6 RENEW message to the DHCPv6 server. Included in the RENEW message is a vendor specific option field containing an indication of the updated state of health of the client, as shown previously for Option Code=0x00DE. When the DHCPv6 server receives the RENEW message, it extracts the state of health information and sends this information to the network policy server so that the network policy server can validate if the client is now compliant. The network policy server will then send a message back to the DHCPv6 server to indicate the result of the validation of the client's updated health state. This message includes the SoH-Response which contains a result of the validation of the client's SoH against the network health policy standards. If the network policy server determines that the client is now compliant, the DHCPv6 server sends a DHCPv6 REPLY message to the client with the SoH-Response and filtering instructions for clearing the previously applied firewall rules. The DHCPv6 Enforcement Agent on the client extracts the SoH-Response and the filtering instructions from the message and instructs the firewall to enable all firewall ports, giving the client full access to the network. If the network policy server determines that the client is still not compliant, the DHCPv6 REPLY message contains updated remediation instructions in the SoH-Response and also contains filtering instructions for obtaining the currently missing updates.

Figure 5:
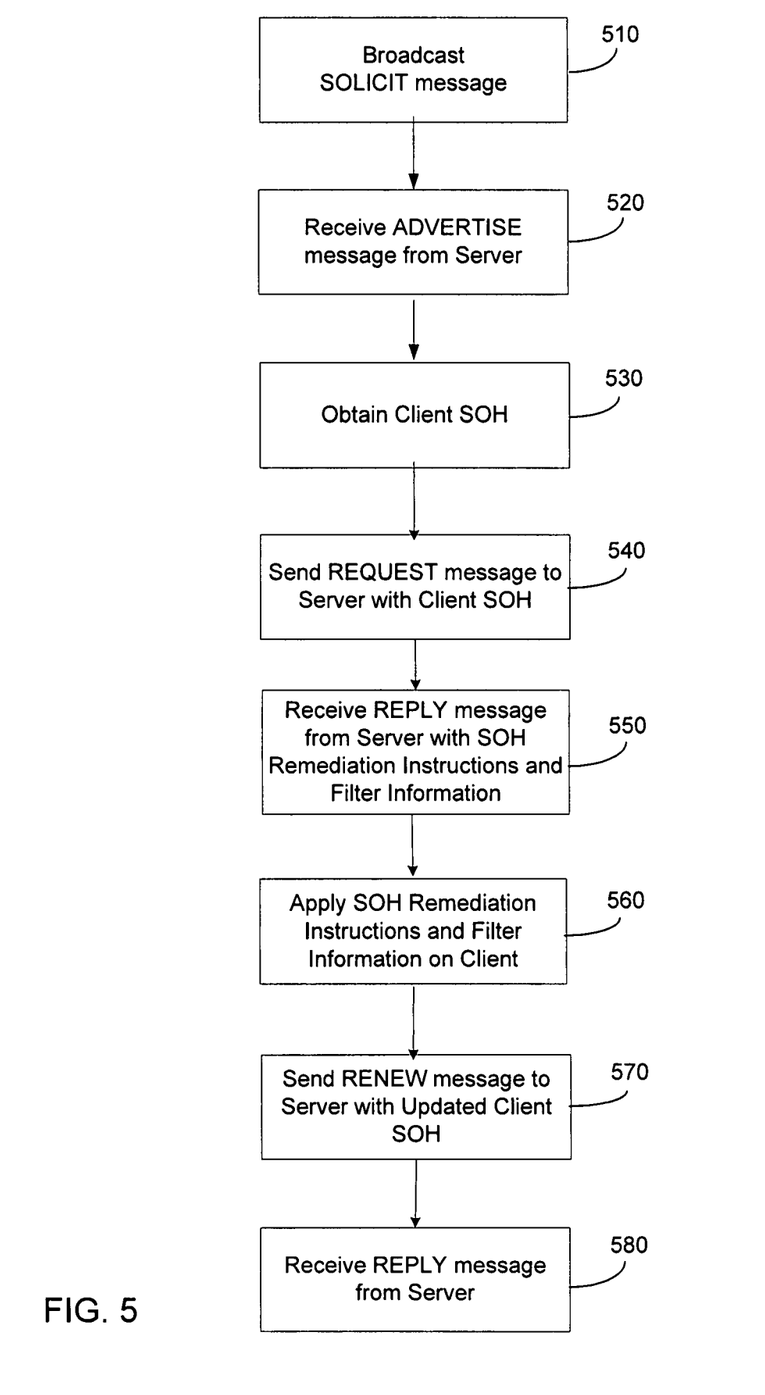
FIG. 5 is a flow chart illustrating an example method for a client to gain access to a network.

FIG. 5 shows the details of example messaging for the client. At block 510, the client broadcasts a DHCPv6 SOLICIT message onto the network. This is typically done to locate a DHCPv6 server on the network. When connecting to the network, the client needs to assess whether it is compliant with the administrator defined health policies for the network. To do this it needs to determine whether the DHCPv6 server supports Network Access Protection. The client includes a vendor-specific option in the SOLICIT message for this purpose.

At block 520, the client receives the ADVERTISE message from the DHCPv6 server in response to the SOLICIT message. If the vendor specific option field indicates that the DHCPv6 server supports an enforcement method for network access protection, at block 530 the state of health of the client is obtained. For example, the Network Access Protection Agent obtains the client's state of health from the set of System Health Agents enabled on the client.

At block 540, the client writes its statement of health into the vendor specific option field of a DHCPv6 message and sends a DHCPv6 REQUEST message containing this vendor specific option field to the DHCPv6 server. The DHCPv6 server sends the client's statement of health to a network policy server to determine if the client's state of health is compliant with administrator defined network health policy standards.

At block 550, the client receives a REPLY message from the DHCPv6 server. Included in the REPLY message is a vendor specific option field that contains remediation and filtering instructions for updating the client's state of health. Both, the remediation and filtering instructions are written according to a schema that can be interpreted by the client.

At block 560, the client applies the filtering instructions obtained from the vendor specific option field of the REPLY message. As shown in FIG. 3, the DHCPv6 Enforcement Agent 340 translates the filtering instructions into firewall rules and applies these firewall rules to firewall 350. For example, the filtering instructions may restrict client access to one or more remediation servers from which the client can obtain software and patches to update its state of health. In this case, the filtering instructions would specify the IP addresses of the remediation servers that the client is permitted to access. The remediation servers are typically on a restricted network to ensure that the client cannot access servers on the normal network until compliance with health policy standards is achieved.

In order to restrict client access in the manner described, the firewall rules cause firewall 350 to shut down all firewall ports so as to restrict traffic to and from the IP addresses specified in the filter list, except to provide access to specific destinations and ports that are required to remedy the client's health. Based on the remediation instructions in the vendor specific field of the REPLY message, the client obtains update patches from the remediation servers for the specific items needed to update its state of health.

Once the client has updated its state of health in this manner, it informs the network policy server so that the network policy server can grant the client unrestricted access to the network. At block 570, the client sends a DHCPv6 RENEW message to the DHCPv6 server. Included in the RENEW message is a vendor specific option field which contains the client's updated state of health status. The DHCPv6 server sends the client's updated health status to the network policy server. If the network policy server confirms that the client's health state is compliant with network health policy standards, at block 580 the client receives a REPLY message from the DHCPv6 server. The REPLY message contains a vendor specific option field with new filtering instructions to allow the client unrestricted access to the network. The DHCPv6 enforcement agent 340 in the client translates these filtering instructions into firewall rules that are applied to firewall 350 to enable firewall ports and thereby grant the client full access to the network.

Figure 6:
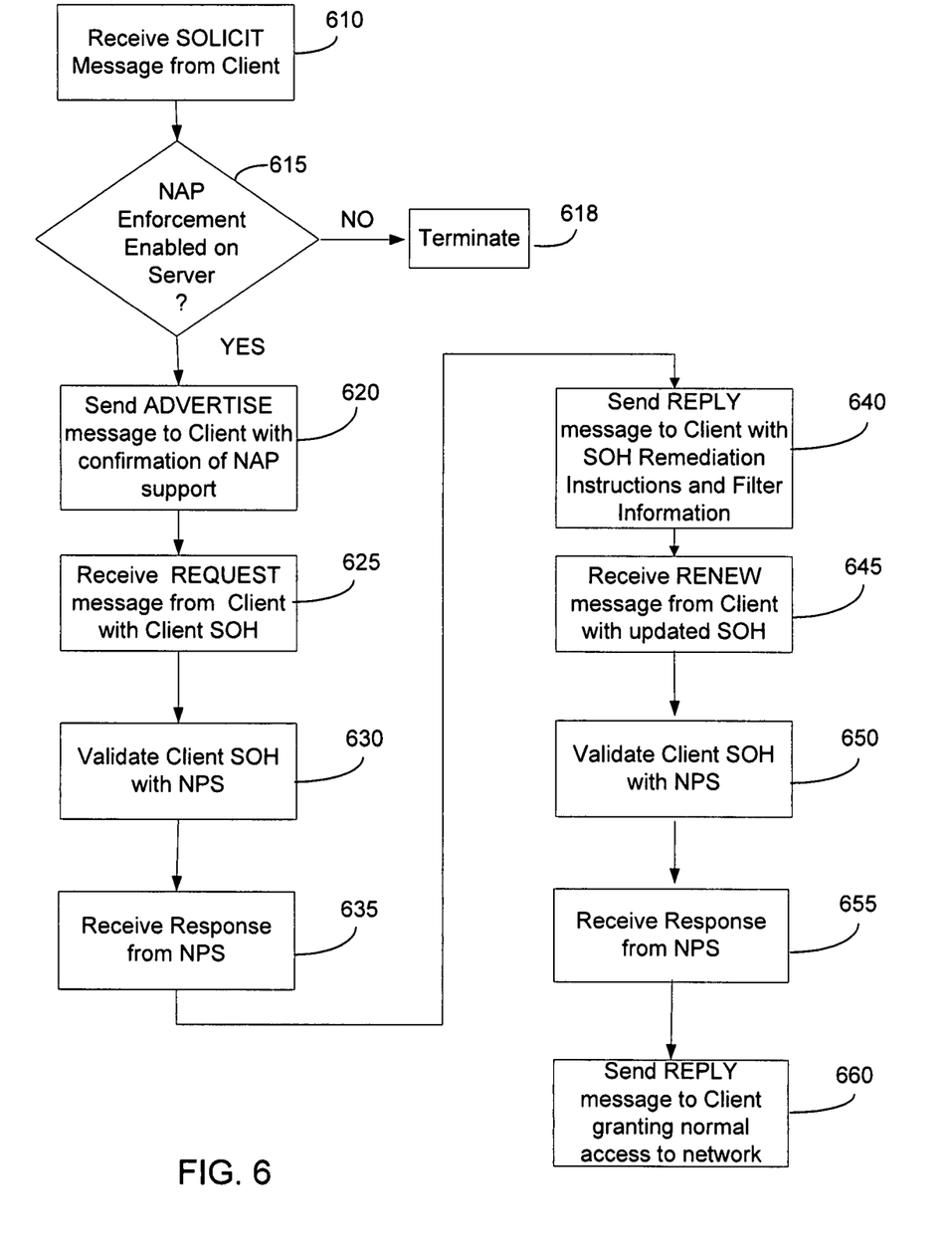
FIG. 6 is a flow chart illustrating an example method for a server to grant a client access to a network.

FIG. 6 shows the details of the communications by the DHCPv6 server. At block 610, the DHCPv6 server receives a DHCPv6 SOLICIT message from the client. Included in the SOLICIT message is a vendor specific option field that contains a request to determine whether the server supports an enforcement method for network access protection, such as the Microsoft Network Access Protection Platform (NAP) or a similar platform. The server makes this determination at block 620. If it supports such a platform, at block 620, the server sends an ADVERTISE message back to the client which includes a vendor specific option field that indicates that the server supports enforcement for network access protection. If the DHCPv6 server does not support an enforcement method for network access protection, it may, depending on its policy settings, ignore the client's vendor-specific option field or it may not send a response back to the client.

At block 625, the DHCPv6 server receives a REQUEST message from the client. The REQUEST message includes a vendor specific option field that contains the client's state of health. At block 630, the DHCPv6 server sends the client's state of health to a network policy server where the client's state of health is validated against administrator defined network health policy standards. In determining whether the client's state of health is compliant with network health policy standards, the network policy server may access several different servers. For example, to determine if the client has the proper version of antivirus software, the client may access a server from Symantec Corporation or one from McAfee Corporation that includes information about the most up-to-date virus signature data. As another example, to determine whether the client has most current patches to its operating system, the network policy server may access a systems management server.

At block 635, the DHCPv6 server receives a response from the network policy server reflecting whether the client's state of health is compliant with network health policy standards. If the client is not compliant, the response DHCPv6 server creates remediation and filtering instructions that will allow the client to obtain compliance. At block 640, the DHCPv6 server sends a REPLY message to the client with the filtering instructions embedded in the vendor specific option field of the message.

The client uses the remediation and filtering instructions in the REPLY message to update its state of health. When the client has the obtained the software patches and updates needed to attain compliance with network health policy standards, it sends a RENEW message to the DHCPv6 server with the vendor specific option field of this message containing the updated statement of health of the client. At block 645, the DHCPv6 server receives the RENEW message from the client. At block 650, the DHCPv6 server sends the client's state of health to the network policy server where it is validated. At block 655, the DHCPv6 server receives a response from the network policy server indicating whether the client is now compliant with network health policy standards. If the client is now compliant, at block 660 the DHCPv6 server sends a REPLY message to the client, indicating to the client that it can now have unrestricted access to the network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling access to a computer network based on a client computer's compliance with network health policy standards, the method comprising:
    sending a request for access to the network from the client computer to a server, the request including a statement of health of the client computer, wherein the statement of health describes the client computer's state with respect to the network health policy standards;
    receiving a first response from the server, the first response including filtering instructions, wherein the filtering instructions are based on the statement of health;
    converting the filtering instructions into firewall rules on the client computer, wherein the firewall rules restrict network access of the client computer to a remediation portion of the network;
    filtering communications from the client computer to the network based on the firewall rules using a firewall on the client computer; and
    after the filtering communications step, remediating a deficiency with respect to the client computer's statement of health by accessing the network.

2. The method of claim 1, wherein filtering communications further comprises filtering the communications such that the client computer only has access to a restricted portion of the network.

3. The method of claim 1, wherein filter communications further comprises limiting Internet Protocol addresses and port numbers on the network with which the client computer can communicate.

4. The method of claim 1, further comprising:
    sending another request for access to the server including an updated statement of health of the client computer;
    receiving a second response from the server, the second response granting the client computer access to the network; and
    removing the filtering by the firewall such that the client computer has unrestricted access to the network.

5. The method of claim 4, wherein the client computer receives update patches from one or more remediation servers.

6. The method of claim 1, further comprising accessing the filtering instructions from a vendor specific field in the first response from the server.

7. The method of claim 1, further comprising:
    sending from the client computer to the server a Dynamic Host Configuration Protocol, version 6 request for access, the request including the vendor-specific option field;
    receiving at the client computer from the server a Dynamic Host Configuration Protocol, version 6 response, the response containing a DHCPv6 vendor-specific option field, the vendor-specific option field indicating the server's capability to grant access based on the client computer's compliance with the health policy standard.

8. The method of claim 1, wherein the filtering instructions include a list of remediation servers that the client computer is permitted to access.

9. The method of claim 8, wherein the filtering instructions include health update patches to be obtained from remediation servers.

10. The method of claim 9, further comprising:
receiving from the server a DHCPv6 REPLY message confirming that the client computer is compliant with the network health policy standards.

11. The method of claim 7, further comprising:
receiving from the server a DHCPv6 REPLY message confirming that the client computer is compliant with the network health policy standards.

12. A method for a first server to determine whether a client computer should be granted access to a computer network, the method comprising:
receiving a request from the client computer for access to the network, the request containing the client computer's state of health;
sending the request to a second server;
receiving a first response from the second server, the first response indicating whether the client computer's state of health is compliant with state of health policies of the network, the first response further including information about specific deficiencies in the client computer's state of health and remediation instructions for the client computer in order to remedy the client computer's health; and
sending a second response to the client computer, the second response including the remediation instructions and filtering instructions, the filtering instructions enabling a firewall on the client to restrict the client computer's access to the network, wherein the filtering instructions are based on the client computer's state of health and restrict network access of the client computer to a remediation portion of the network containing one or more remediation resources, and further wherein the remediation instructions contain information related to remediation the client computer must obtain from the one or more remediation resources.

13. The method of claim 12, further comprising:
receiving at the first server from the client computer a renew message, the renew message containing a DHCPv6 vendor specific option field, said vendor specific option field containing the client computer's updated state of health;
sending from the first server to the second server a message containing the client computer's updated state of health, said message requesting the second server to validate the client computer's state of health;
receiving at the first server from the second server a message indicating whether the client computer's state of health is compliant with state of health policies of the network; and
sending from the first server to the client computer a message confirming that the client computer is compliant with network state of health policy.

14. The method of claim 12, wherein the second server is a network policy server.

15. A system for controlling access to a computer network based on a client computer's compliance with network health policy standards, the system comprising a processor operatively coupled to a computer memory, the computer memory containing instructions that, when executed, perform a method, the method comprising:
sending a request for access to the network from the client computer to a server, the request including a statement of health of the client computer, wherein the statement of health describes the client computer's state with respect to the network health policy standards;
receiving a first response from the server, the first response including filtering instructions, wherein the filtering instructions are based on the statement of health;
converting the filtering instructions into firewall rules on the client computer, wherein the firewall rules restrict network access to a remediation portion of the network;
filtering communications from the client computer to the network based on the firewall rules using a firewall on the client computer; and
after the filtering communications step, remediating a deficiency with respect to the client computer's statement of health by accessing the network.

16. The system of claim 15, wherein filtering communications further comprises filtering the communications such that the client computer has access to only a restricted portion of the network.

17. The system of claim 15, wherein filtering communications further comprises limiting Internet Protocol addresses and port numbers on the network with which the client computer can communicate.

18. The system of claim 15, wherein the method further comprises:
sending another request for access to the server including an updated statement of health of the client computer;
receiving a second response from the server, the second response granting the client computer access to the network; and
removing the filtering by the firewall such that the client computer has unrestricted access to the network.

19. The system of claim 15, wherein the client computer receives update patches from one or more remediation servers.

20. The system of claim 15, further comprising accessing the filtering instructions from a vendor specific field in the first response from the server.

* * * * *